(12) United States Patent
Phillips et al.

(10) Patent No.: US 9,033,315 B2
(45) Date of Patent: May 19, 2015

(54) ADJUSTABLE IN-LINE ON DEMAND CARBONATION CHAMBER FOR BEVERAGE APPLICATIONS

(71) Applicant: Flow Control LLC, Gloucester, MA (US)

(72) Inventors: David L. Phillips, Santa Ana, CA (US); Robert J. Romero, Anaheim, CA (US); Christopher H. Verdugo, Yorba Linda, CA (US)

(73) Assignee: FLOW CONTROL LLC., Beverly, MA (US)

( * ) Notice: Subject to any disclaimer, the term of this patent is extended or adjusted under 35 U.S.C. 154(b) by 226 days.

(21) Appl. No.: 13/649,256

(22) Filed: Oct. 11, 2012

(65) Prior Publication Data
US 2013/0270722 A1   Oct. 17, 2013

Related U.S. Application Data

(60) Provisional application No. 61/545,794, filed on Oct. 11, 2011.

(51) Int. Cl.
*B01F 3/04* (2006.01)
*A23L 2/00* (2006.01)
*B01F 5/00* (2006.01)
(Continued)

(52) U.S. Cl.
CPC ......... *B01F 3/04808* (2013.01); *B01F 3/04099* (2013.01); *B01F 3/04106* (2013.01); *A23L 2/00* (2013.01); *B01F 3/04787* (2013.01); *B01F 5/0077* (2013.01); *B01F 5/0688* (2013.01); *B01F 15/00344* (2013.01);
(Continued)

(58) Field of Classification Search
CPC .... B01F 3/04; B01F 3/04099; B01F 3/04106; B01F 3/04787; B01F 3/04808; A23L 2/00
USPC ....... 261/64.1, 64.3, 76, 77, DIG. 7; 426/474; 99/323.1
See application file for complete search history.

(56) References Cited

U.S. PATENT DOCUMENTS 2,442,801 A *  6/1948  Di Pietro .................... 62/171
3,761,066 A     9/1973  Wheeler
(Continued)

FOREIGN PATENT DOCUMENTS

DE     19833832     3/1999
DE     19841714     2/2000
(Continued)

OTHER PUBLICATIONS

English language abstract for DE102006047068 unavailable, 1 page
English language abstract for WO2008037500.

*Primary Examiner* — Robert A Hopkins (57) ABSTRACT

Apparatus, including a carbonation chamber, is provided that includes a mixing and metering member and a gas adjustment member. The mixing and metering member is configured to respond to a fluid, including water, and an adjustable amount of gas, including $CO_2$, and may be configured to provide a mixture of the fluid and the gas. The gas adjustment member is configured to receive the gas, including from a gas inlet, and to provide the adjustable amount of gas to the mixing and metering member, based at least partly on an adjustable axial relationship between the mixing and metering member and the gas adjustment member in order to control a desired carbonation level of the mixture.

41 Claims, 9 Drawing Sheets

(51) Int. Cl.
  *B01F 5/06*      (2006.01)
  *B01F 15/00*     (2006.01)
  *B01F 15/02*     (2006.01)

(52) U.S. Cl.
  CPC ........ *B01F 15/0261* (2013.01); *B01F 3/04503* (2013.01); *B01F 3/04758* (2013.01); *B01F 3/04815* (2013.01)

(56) References Cited

U.S. PATENT DOCUMENTS

| | | |
|---|---|---|
| 4,313,897 A | 2/1982 | Garrard |
| 4,694,907 A | 9/1987 | Stahl et al. |
| 4,834,343 A | 5/1989 | Boyes |
| 4,876,780 A | 10/1989 | Stahl et al. |
| 4,938,946 A | 7/1990 | Gibson et al. |
| 4,940,164 A | 7/1990 | Hancock et al. |
| 4,948,477 A | 8/1990 | Gibson et al. |
| 4,984,713 A | 1/1991 | Chambers et al. |
| 5,029,733 A | 7/1991 | Hedderick et al. |
| 5,062,548 A | 11/1991 | Hedderick et al. |
| 5,140,822 A | 8/1992 | Gupta |
| 5,231,851 A | 8/1993 | Adolfsson |
| 5,310,088 A | 5/1994 | Burrows |
| 5,348,696 A | 9/1994 | Gibson et al. |
| 5,417,147 A | 5/1995 | Mason |
| 5,419,461 A | 5/1995 | Goulet |
| 5,536,378 A | 7/1996 | Gibson et al. |
| 5,592,867 A | 1/1997 | Walsh et al. |
| 5,749,233 A | 5/1998 | Adolfsson |
| 5,842,600 A | 12/1998 | Singleterry et al. |
| 5,918,468 A | 7/1999 | Cassells et al. |
| 6,060,092 A | 5/2000 | Oesterwind et al. |
| 6,260,477 B1 | 7/2001 | Tuyls et al. |
| 6,560,972 B2 | 5/2003 | Ubidia |
| 6,698,229 B2 | 3/2004 | Renken et al. |
| 6,761,036 B2 | 7/2004 | Teague et al. |
| 6,915,925 B2 | 7/2005 | Crisp, III et al. |
| 2003/0168754 A1 | 9/2003 | Spiegel et al. |
| 2007/0248719 A1 | 10/2007 | Koch et al. |
| 2007/0257378 A1 | 11/2007 | Spiegel |
| 2008/0210408 A1 | 9/2008 | Sterngold et al. |
| 2008/0283532 A1 | 11/2008 | Koch |
| 2009/0238938 A1 | 9/2009 | Spiegel |
| 2010/0133708 A1 | 6/2010 | Fischer |
| 2011/0042414 A1 | 2/2011 | Tachibana et al. |

FOREIGN PATENT DOCUMENTS

| | | | |
|---|---|---|---|
| DE | 19849628 | | 5/2000 |
| DE | 19851360 | | 5/2000 |
| DE | 10160397 | | 6/2003 |
| DE | 102006047068 | | 3/2008 |
| DE | 102008012486 | | 9/2009 |
| DE | 102009031081 | | 3/2011 |
| EP | 0919518 | | 6/1999 |
| EP | 1084989 | | 3/2001 |
| EP | 1090677 | | 4/2001 |
| EP | 1364909 | | 11/2003 |
| EP | 1514836 | | 3/2005 |
| EP | 1579905 | | 9/2005 |
| EP | 1579906 | | 9/2005 |
| EP | 1629882 | | 3/2006 |
| EP | 1688691 | | 8/2006 |
| EP | 1878691 | | 1/2008 |
| EP | 2070587 | | 6/2009 |
| FR | 2255943 | | 7/1975 |
| GB | 2289425 | | 11/1995 |
| GB | 2347093 | | 8/2000 |
| GB | 2404914 | | 2/2005 |
| GB | 2408467 | | 6/2005 |
| GB | 2437511 | | 10/2007 |
| GB | 2474741 | | 4/2011 |
| JP | 02273565 A | * | 11/1990 |
| JP | 5-310296 | | 11/1993 |
| JP | 10-302141 | | 11/1998 |
| JP | 11-116223 | | 4/1999 |
| JP | 11-195171 | | 7/1999 |
| JP | 2000-72199 | | 3/2000 |
| JP | 2000-163651 | | 6/2000 |
| JP | 2000-327095 | | 11/2000 |
| JP | 2000-348250 | | 12/2000 |
| JP | 2001-130697 | | 5/2001 |
| JP | 2001-170463 | | 6/2001 |
| JP | 2002-128197 | | 5/2002 |
| JP | 2002-264996 | | 9/2002 |
| JP | 2002-340460 | | 11/2002 |
| JP | 2003-30737 | | 1/2003 |
| JP | 2003-141625 | | 5/2003 |
| JP | 2004-238052 | | 8/2004 |
| JP | 2008-74497 | | 4/2008 |
| KR | 10-2008-0076103 | | 8/2008 |
| WO | 9310035 | | 5/1993 |
| WO | 9405408 | | 3/1994 |
| WO | 9405591 | | 3/1994 |
| WO | 9412425 | | 6/1994 |
| WO | 9847812 | | 10/1998 |
| WO | 0007707 | | 2/2000 |
| WO | 0107355 | | 2/2001 |
| WO | 0238261 | | 5/2002 |
| WO | 02068314 | | 9/2002 |
| WO | 03008326 | | 1/2003 |
| WO | 03024862 | | 3/2003 |
| WO | 2005047171 | | 5/2005 |
| WO | 2006092704 | | 9/2006 |
| WO | 2006101435 | | 9/2006 |
| WO | 2007071224 | | 6/2007 |
| WO | 2007107704 | | 9/2007 |
| WO | 2007112892 | | 10/2007 |
| WO | 2008138400 | | 11/2008 |
| WO | 2009047000 | | 4/2009 |

\* cited by examiner

Fig. 3a: 1 Hole Exposed

Fig. 3b: 2 Hole Exposed

Fig. 3c: 3 Hole Exposed

Fig. 3d: 4 Hole Exposed

Fig. 3e: 5 Hole Exposed

ADJUSTABLE IN-LINE ON DEMAND CARBONATION CHAMBER FOR BEVERAGE APPLICATIONS

CROSS-REFERENCE TO RELATED APPLICATIONS

This application claims benefit to provisional patent application Ser. No. 61/545,794, filed 11 Oct. 2011, which is hereby incorporated by reference in its entirety.

BACKGROUND OF THE INVENTION

1. Field of the Invention

The present invention relates to a carbonation device; and more particularly relates to a carbonation device that may be adjusted to control the level of carbonation in a mixture of fluid and gas.

2. Brief Description of Related Art

Traditional carbonating devices in the beverage industry are high pressure motor pump units coupled with accumulator tanks and electronic switching. Such traditional carbonating devices typically all require high pressure pumps, electricity and are subject to frequent breakdowns due to the mechanical nature of the pump. Extra plumbing is typically required to run to the pump and back to the dispense equipment.

In view of this, there is a need in the marketplace for an carbonating device for carbonating a mixture of fluid and gas, e.g., including for carbonating a beverage like soda or beer.

SUMMARY OF THE INVENTION

According to some embodiments, the present invention may take the form of apparatus, including a carbonation chamber, that includes a mixing and metering member and a gas adjustment member. The mixing and metering member may be configured to respond to a fluid, including water, and an adjustable amount of gas, including $CO_2$, and may be configured to provide a mixture of the fluid and the gas. The gas adjustment member may be configured to receive the gas, including from a gas inlet, and to provide the adjustable amount of gas to the mixing and metering member, based at least partly on an adjustable axial relationship between the mixing and metering member and the gas adjustment member in order to control a desired carbonation level of the mixture.

According to some embodiments of the present invention, the apparatus may include one or more of the following features:

The mixing and metering member may include a gas receiving part; the gas adjustment member may include a sealing member; and the adjustable amount of gas provided from the gas adjustment member to the mixing and metering member may be based at least partly on the adjustable axial relationship between the gas receiving part of the mixing and metering member and the sealing member of the gas adjustment member.

The gas receiving part may include axially arranged gas receiving orifices; the sealing member may include an O-ring; and the adjustable amount of gas provided from the gas adjustment member to the mixing and metering member may be based at least partly on the adjustable axial relationship between the axially arranged gas receiving orifices of the gas receiving part and the O-ring of the sealing member.

The adjustable amount of gas provided from the gas adjustment member to the mixing and metering member may be based at least partly on the number of the axially arranged gas receiving orifices being sealed off or not exposed by the O-rings.

The gas adjustment member may be configured with the gas inlet; and the mixing and metering member may include a fluid inlet, a metering orifice member and a mixing chamber; and the metering orifice member may include:
  a first portion formed with a first set of orifices configured to allow the fluid to pass from the fluid inlet to the mixing chamber, and
  a second portion configured so as to form an enclosed space or cavity therein, configured with a second set of orifices to allow the gas to pass from the gas inlet into the enclosed space or cavity, and configured with a third set of orifices to allow the gas to pass from the enclosed space or cavity to the mixing chamber.

The gas adjustment member may include the sealing portion or member configured to be adjusted up or down the gas receiving part so to allow the gas to pass from the gas inlet through one or more of the second set of orifices into the enclosed space or cavity.

The sealing portion or member may include the O-ring configured to engage the gas receiving part, so that any of the second set of orifices on one side of the O-ring are in communication with the gas inlet so the gas can pass through, and so that any other of the second set of orifices on the other side of the O-ring are not in communication with the gas inlet so the gas cannot pass through.

The gas adjustment member may be configured with an internal circumferential groove and the O-ring may be arranged therein.

The second portion of the metering orifice member may include a check valve configured to seal one part of the enclosed space or cavity of the second portion having the second set of orifices from another part of the enclosed space or cavity of the second portion having the third set of orifices. The check valve may include a ball and spring arranged therein. The check valve may be configured to allow the amount of gas to pass from the enclosed space or cavity through the third set of orifices to the mixing chamber and to prevent the fluid from passing from the mixing chamber into said another part of enclosed space or cavity of the second portion having the second set of orifices, based at least partly the pressure of the gas in the enclosed space or cavity and the pressure of a fluid/gas mixture in the mixing chamber.

The pressure of the gas in the enclosed space or cavity may be based at least partly on the number of the second set of orifices that the gas can pass through.

The gas adjustment member may include an end portion having an opening formed therein configured to receive the gas receiving part and to allow the amount of gas to pass from the gas inlet through one or more of the second set of orifices to the enclosed space or cavity of the second portion of the metering orifice member. The end portion may be configured with an internal O-ring for providing a gas seal with the gas receiving portion. The end portion may be configured with an outer O-ring for providing a gas seal with the gas housing of the mixing and metering member.

In operation, the fluid is introduced into the carbonation chamber via the fluid inlet, and enters the mixing chamber via the metering orifice member. The water is forced through the holes or orifices in the metering orifice member into the mixing chamber. For example, the first portion of the metering orifice member may include a cylindrical portion having a cylindrical wall, and the first set of orifices may be configured or formed as one or more encircling arrangements, each having a multiplicity of orifices arranged circumferentially around the cylindrical wall. The cylindrical portion may include a longitudinal axis and the first set of orifices may be configured or formed as a plurality of encircling arrangements, each having a respective multiplicity of orifices arranged circumferentially around the cylindrical wall in relation to the longitudinal axis. The multiplicity of orifices arranged circumferentially around the cylindrical wall may be arranged or spaced equi-distantly around the cylindrical wall.

In operation, the gas enters the gas adjustment member, and is then metered through holes in the metering orifice member. For example, the second portion of the metering orifice member may include a second cylindrical portion having a cylindrical wall, and the second set of orifices may be configured or formed as an arrangement of orifices arranged axially along the cylindrical wall. The cylindrical portion has a longitudinal axis and the second set of orifices may be configured or formed along or in parallel with the longitudinal axis. The second set of orifices may be arranged or spaced equi-distantly along the cylindrical wall.

The metering orifice member may be configured with multiple inlet holes for the gas to be injected in the mixing chamber. For example, the second portion of the metering orifice member may include a third cylindrical portion having a cylindrical wall, and the third set of orifices may be configured or formed as an arrangement of a plurality or multiplicity of orifices formed in the cylindrical wall, including where the gas is provided to the fluid inlet and into the mixing chamber via the first set of orifices. Alternatively, the plurality or multiplicity of orifices may be formed as a pair of orifices diametrically opposed from one another, including where the gas is provided to the mixing chamber directly via the pair of orifices. Embodiments may include using both the plurality or multiplicity of orifices in combination with the pair of diametrically opposed orifices.

The apparatus may include the mixing chamber configured to mix the fluid passing through the first set of orifices and the gas passing through the third set of orifices. The mixing chamber may be configured or formed with an aeration port having a multiplicity of orifices to maintain a back pressure in the mixing chamber so as to provide a dwell time to allow the fluid and gas to mix. The aeration port may be configured to provide turbulence so as to provide increased fluidic surface area for the fluid and gas to mix.

The fluid in the fluid inlet may be under pressure sufficiently high enough to force the fluid through the first set of orifices so as to create and expose increased fluidic surface area for the fluid and gas to mix.

The first set of orifices, the second set of orifices, the third set of orifices, or some combination thereof, may be configured or formed as circular orifices. Alternatively, the first set of orifices, the second set of orifices, the third set of orifices, or some combination thereof, may be configured or formed as non-circular orifices, including being shaped as triangular, a square, a pentagon, a hexagon, a heptagon or an octagon.

The gas adjustment member may be configured to be slidably adjustable in relation to the gas receiving part of the second portion, so as to move smoothly along the surface of the gas receiving part of the second portion of the mixing orifice member.

The gas adjustment member may be configured to be rotationally adjustable in relation to the gas receiving part of the second portion, so as to screw towards or away from the metering orifice member. For example, the gas adjustment member may include threads, a gas housing of the mixing and metering member may include corresponding threads, and the threads of the gas adjustment member may be configured to rotationally coupling to the corresponding threads of the gas housing.

The mixing and metering member may include, or be configured with, a fluid housing and a gas housing. By way of example, the fluid housing may be configured with a fluid housing wall having the fluid inlet formed therein. The gas housing may be configured with a first gas housing wall to couple to the fluid housing wall of the fluid housing and also to form the mixing chamber therein. The gas housing may include, or be configured with, a second gas housing wall, and the metering orifice member may be configured between the fluid housing wall of the fluid housing and the second gas housing wall of the gas housing so that the first portion of the metering orifice member is arranged between the fluid inlet and the mixing chamber. The second gas housing wall may be configured or formed with a central opening to receive the gas receiving part of the second portion and also to allow the gas receiving part to extend outwardly beyond the central opening. The central opening may be formed by a central opening wall that may be configured to receive the gas adjustment member on one end, so that the gas adjustment member receives the gas receiving part. The central opening wall may be configured or formed with an internal groove and the O-ring may be arranged therein to engage the gas receiving part in a sealing manner or way. The second gas housing wall may also include two or more extending members or supports configured to seat a back wall of the first portion of the metering orifice member when the fluid housing and gas housing are coupled together, so as to allow the gas to pass directly from the metering orifice member to the mixing chamber. The fluid housing wall may also include a circumferential groove or channel configured to receive the first portion of the metering orifice member when the fluid housing and gas housing are coupled together. The fluid housing wall may also include a circumferential flange configured to receive the first gas housing wall when the fluid housing and gas housing are coupled together.

The present invention provides an inline, on demand carbonation mixing chamber. One advantage of the present invention is that there is no need for extra plumbing as the present invention is inline to the existing plumbing or installed directly at the point of dispense.

BRIEF DESCRIPTION OF THE DRAWING

The drawing, which are not necessarily drawn to scale, includes the following Figures.

Figures in the drawing are populated with lead lines and reference numerals so as to read consistent with the specification. However, for the sake of reducing clutter in the drawing as a whole, each Figures does not contain every lead line and reference numeral.

DETAILED DESCRIPTION OF THE INVENTION

Figure 1:
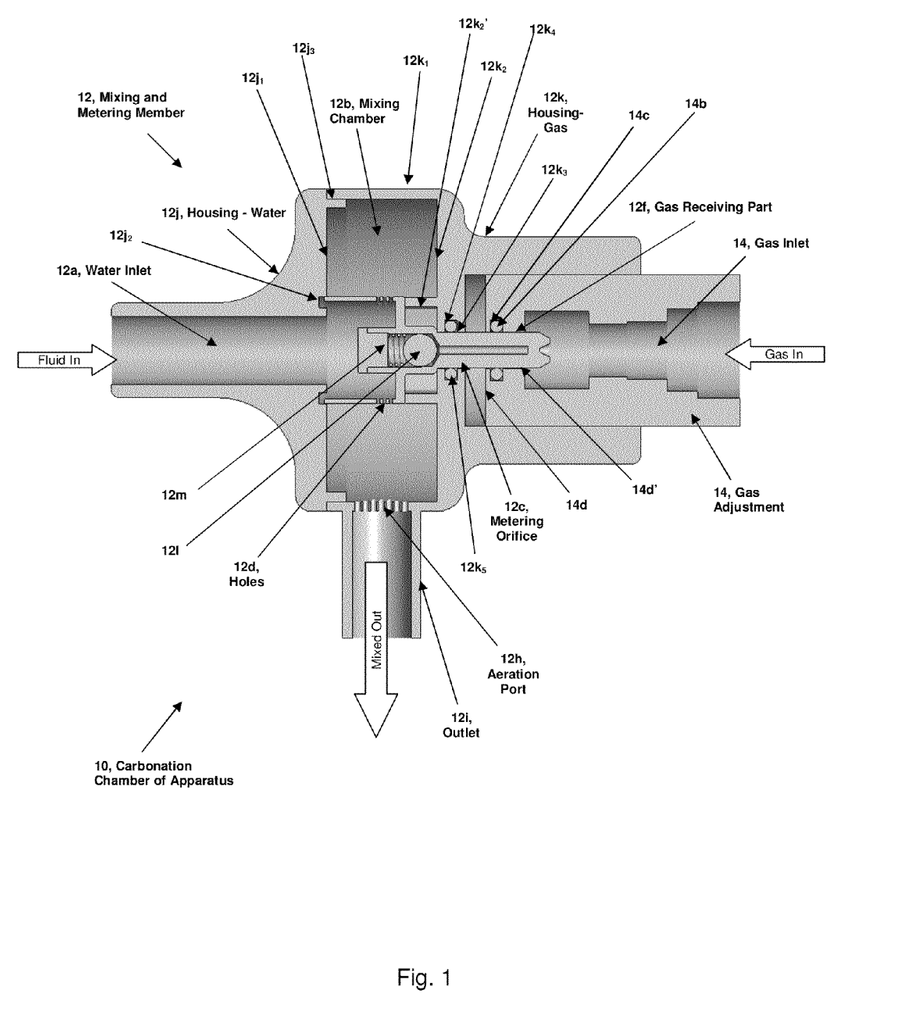
FIG. 1 is a cutaway view of apparatus, including an adjustable in-line, on demand carbonation chamber, according to some embodiments of the present invention.

FIG. 1 shows the present invention in the form of apparatus generally indicated as 10, including a carbonation chamber or unit, that includes a mixing and metering member generally indicated as 12 and a gas adjustment member generally indicated as 14. In operation, the mixing and metering member 12 may be configured to respond to a fluid, including water, and an adjustable amount of gas, including $CO_2$, and may be configured to provide a mixture of the fluid and the gas. Moreover, the gas adjustment member 14 may be configured to receive the gas, including from a gas inlet, and to provide the adjustable amount of gas to the mixing and metering member 12, based at least partly on an adjustable axial relationship between the mixing and metering member 12 and the gas adjustment member 14 in order to determine or control a desired carbonation level of the mixture.

In particular, water is introduced in the carbonation chamber or unit 10 via the water inlet 12a, and enters a mixing chamber 12b via a metering orifice 12c. The water is forced through holes 12d formed or configured in the metering orifice 12c into the mixing chamber 12b. The $CO_2$ gas enters the gas adjustment member 14 via a gas inlet 14a, and is then metered through holes 12e (see FIG. 2) formed or configured in a gas receiving part 12f of the metering orifice 12c. The metering orifice 12c has multiple inlet holes $12g_1$ for the gas to be injected in the mixing chamber 12b, e.g., including via the water inlet 12a and the holes 12d. See also FIG. 4, where the metering orifice 12c is configured with two diametrically opposed inlet holes $12g_2$ for the gas to be injected directly in the mixing chamber 12b. (In FIGS. 1-2, the metering orifice 12c is rotated 90° so that the two diametrically opposed inlet holes $12g_2$ are not shown.) The scope of the invention is intended to include the gas being provided from the metering orifice 12c to the mixing chamber 12b either directly, or indirectly via the water inlet 12a and the holes 12d, or some combination thereof. The water that is forced into the mixing chamber 12b is under pressure to help expose the most surface area possible to the gas that is injected from the gas adjustment member or item 14. The gas that is injected from the metering orifice member or item 12b is mixed with the water. An aeration port 12h helps maintain a back pressure in the mixing chamber 12b to give a maximum dwell time to allow the water and gas to mix. As the mixture is forced through the aeration port 12h turbulence is once again added to provide more surface area for the gas to mix to the water. The gas adjustment member or item 14 is designed or configured to receive the gas receiving part 12f and to be axially adjusted up or down of the metering orifice 12c to control the amount of the gas that is injected into the mixing chamber 12b. By using this method or technique, the carbonation level of the water may be controlled or determined as required. The carbonated fluid is provided via an outlet 12i. In FIG. 1, the mixing and metering member 12 is also configured with a water housing 12j and a gas housing 12k, and the metering orifice 12c is also configured with a check valve arrangement or combination having a ball 12l and a spring 12m, which will be described in further detail below.

Figure 2:
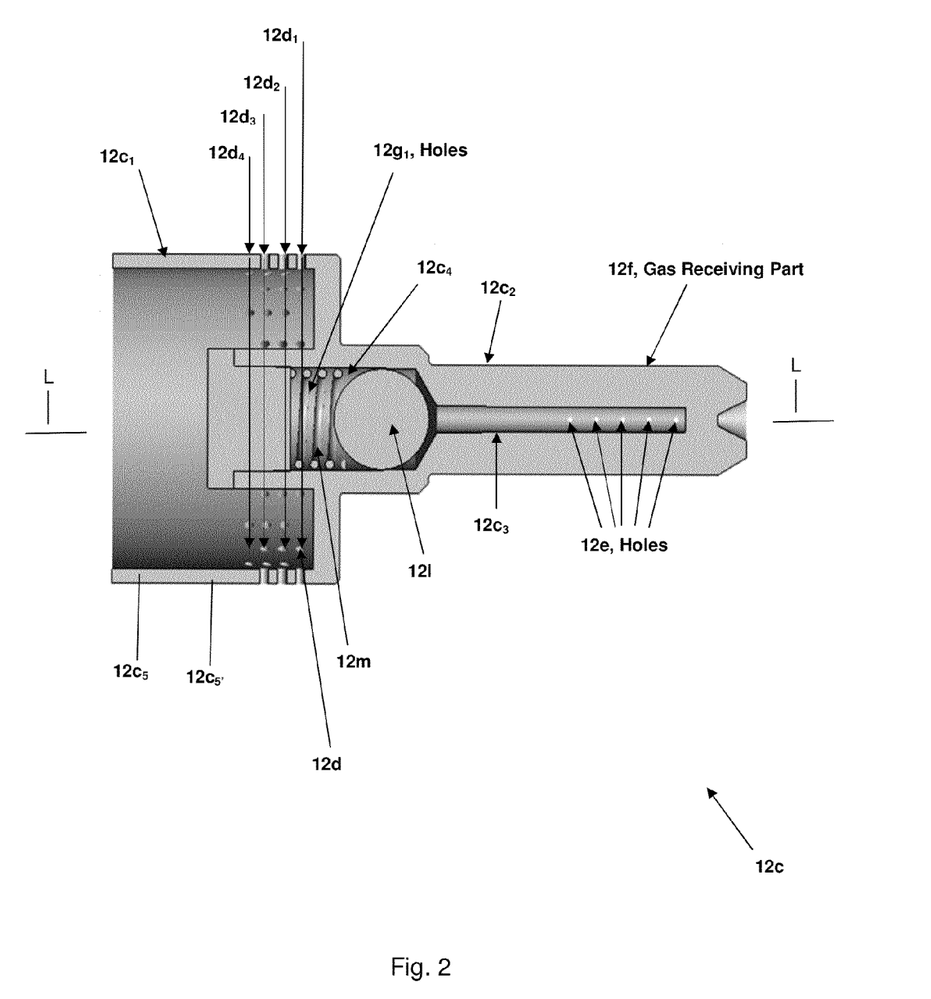
FIG. 2 is a cutaway view of a mixing orifice member that forms part of the apparatus, according to some embodiments of the present invention.
Figure 3A:
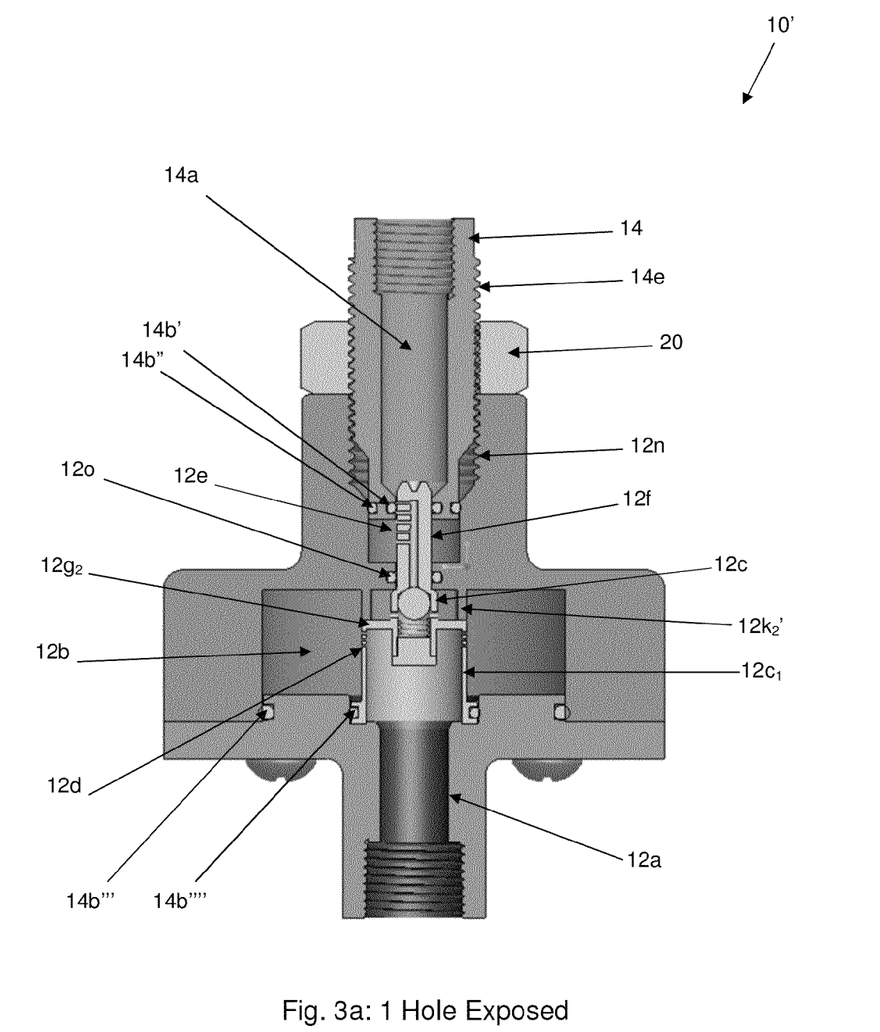
FIG. 3a is a cutaway view of apparatus, including an adjustable in-line, on demand carbonation chamber, having a mixing and metering member axially arranged in relation to a gas adjustment member with one gas provisioning hole exposed, according to some embodiments of the present invention.
Figure 3B:
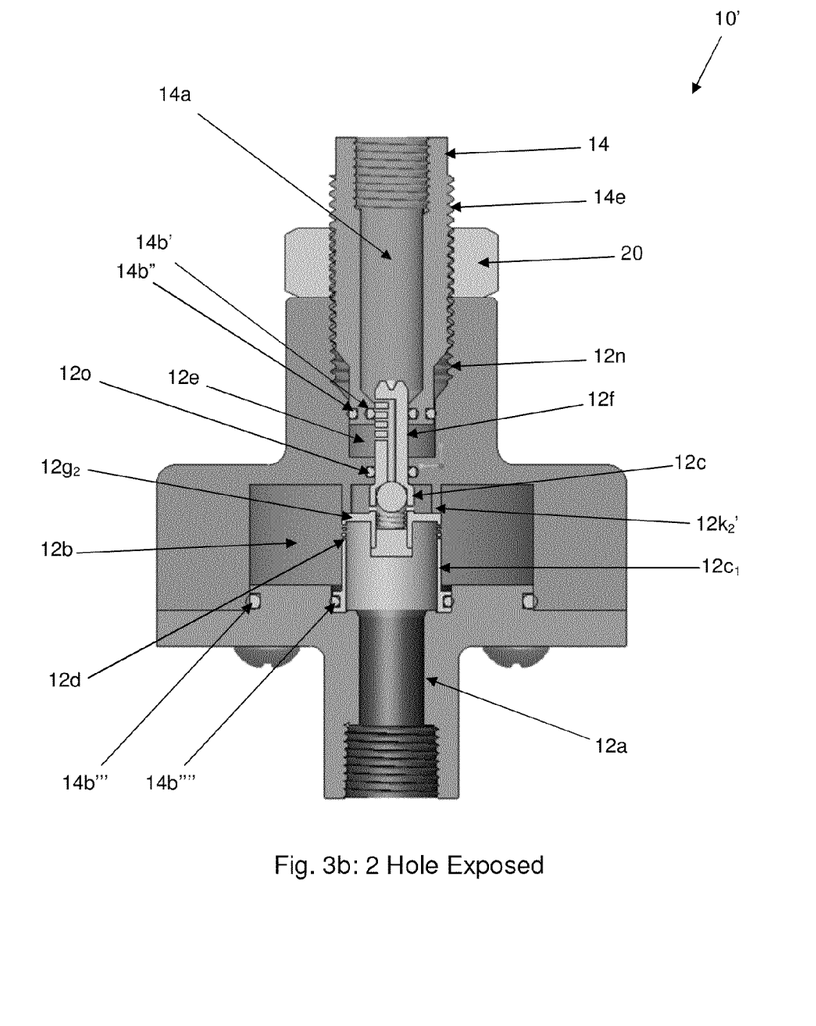
FIG. 3b is a cutaway view of apparatus, including an adjustable in-line, on demand carbonation chamber, having a mixing and metering member axially arranged in relation to a gas adjustment member with two gas provisioning holes exposed, according to some embodiments of the present invention.
Figure 3C:
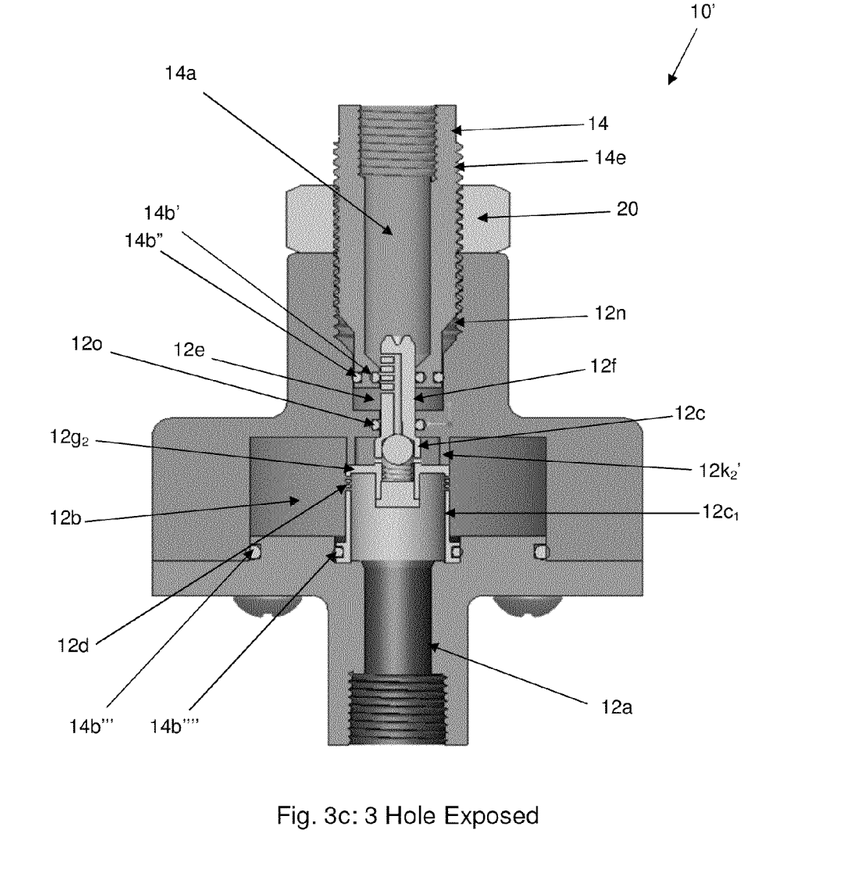
FIG. 3c is a cutaway view of apparatus, including an adjustable in-line, on demand carbonation chamber, having a mixing and metering member axially arranged in relation to a gas adjustment member with three gas provisioning holes exposed, according to some embodiments of the present invention.
Figure 3D:
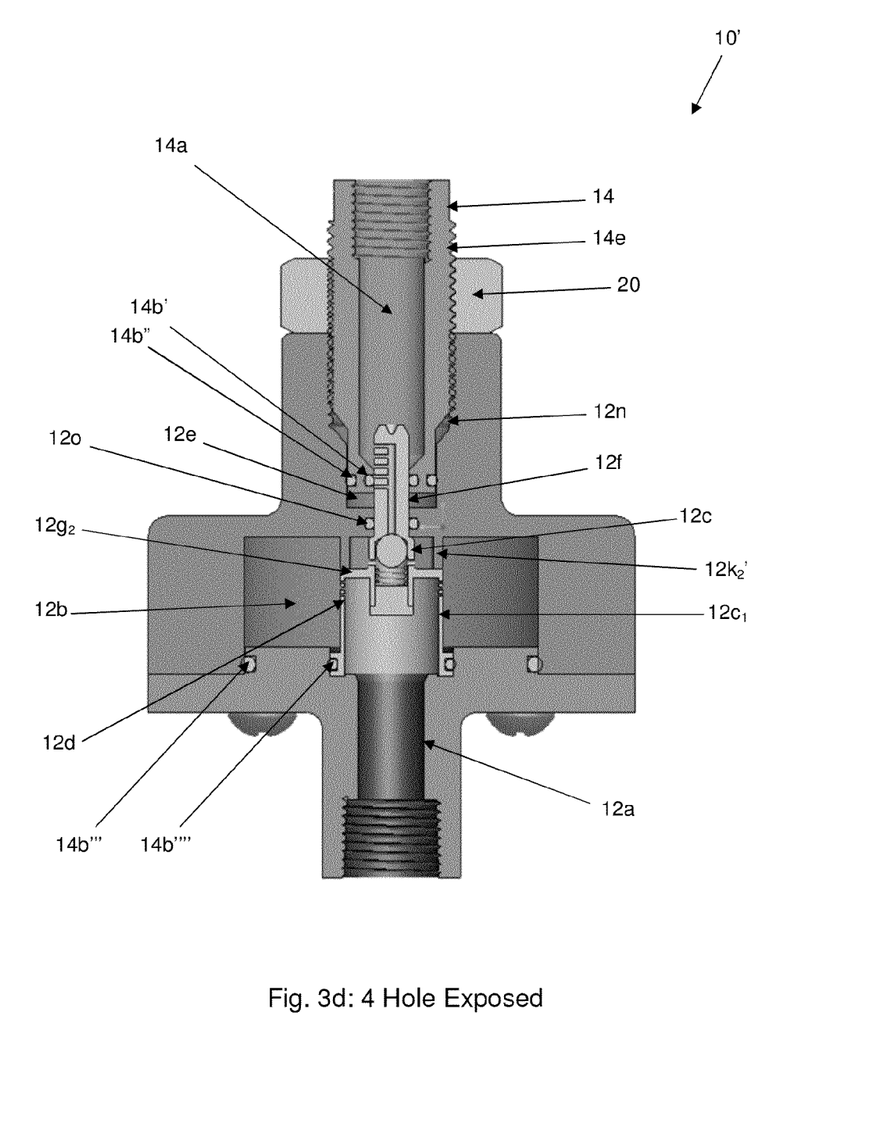
FIG. 3d is a cutaway view of apparatus, including an adjustable in-line, on demand carbonation chamber, having a mixing and metering member axially arranged in relation to a gas adjustment member with four gas provisioning holes exposed, according to some embodiments of the present invention.
Figure 3E:
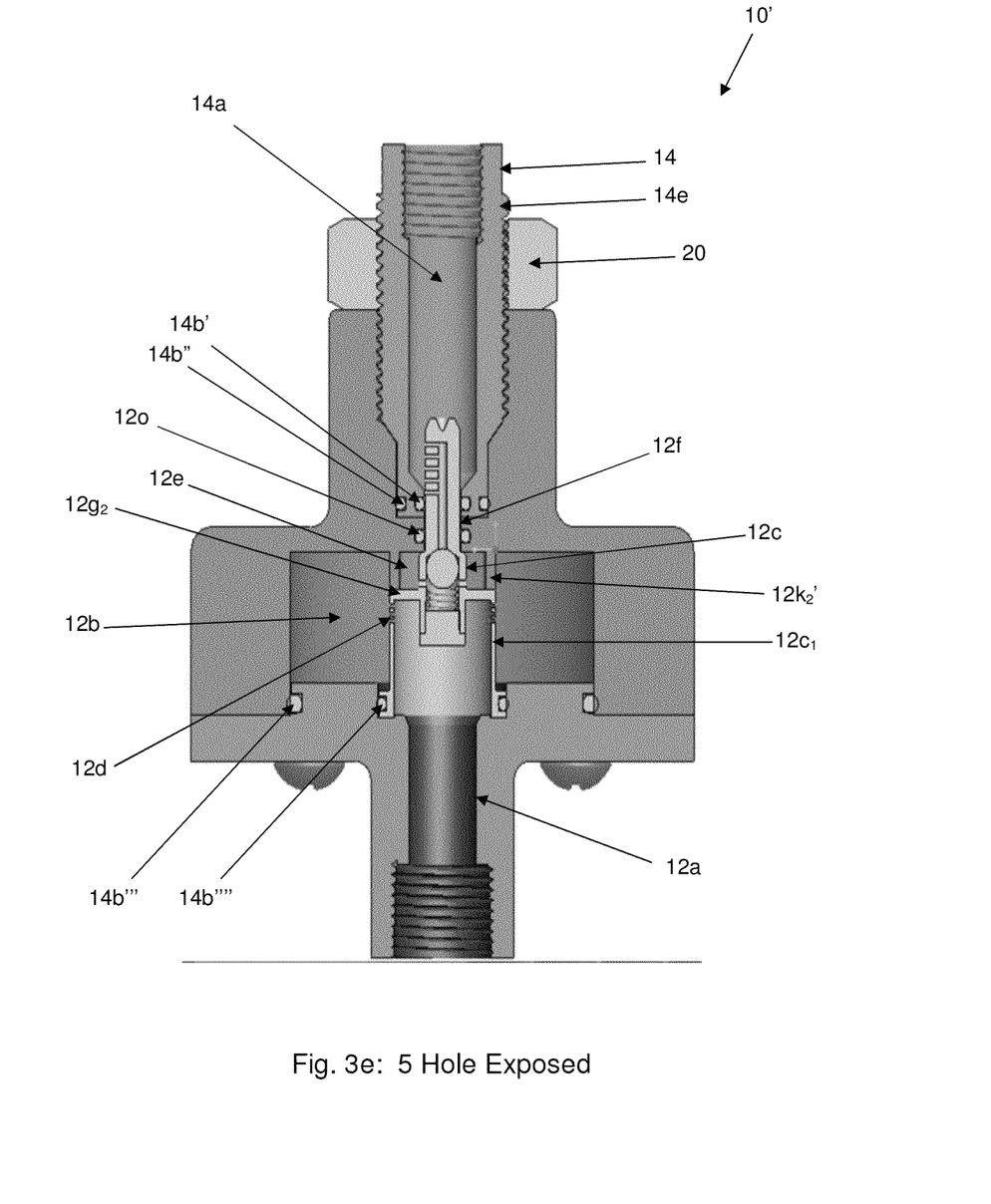
FIG. 3e is a cutaway view of apparatus, including an adjustable in-line, on demand carbonation chamber, having a mixing and metering member axially arranged in relation to a gas adjustment member with five gas provisioning holes exposed, according to some embodiments of the present invention.

According to some embodiments of the present invention, the apparatus 10 or 10' (see FIGS. 3a to 3e) may include one or more of the following features:

For example, the gas adjustment member 14 may be configured with a sealing portion or member 14b, e.g., including an O-ring, and the adjustable amount of gas provided from the gas adjustment member 14 to the mixing and metering member 12 may be based at least partly on the adjustable axial relationship between the gas receiving part 12f of the mixing and metering member 12 and the sealing member 14b of the gas adjustment member 14. For example, the gas receiving part 12f may be configured with, or include, the axially arranged gas receiving orifices 12e (FIG. 2); and the adjustable amount of gas provided from the gas adjustment member 14 to the mixing and metering member 12 may be based at least partly on the adjustable axial relationship between the axially arranged gas receiving orifices 12e and the O-ring 14b. In particular, and by way of example, the adjustable amount of gas provided from the gas adjustment member 14 to the mixing and metering member 12 may be based at least partly on the number of the axially arranged gas receiving orifices 12e being sealed off or exposed by the O-rings 14b. FIGS. 3a through 3e show the embodiment of the apparatus generally indicated as 10', having respectively axial adjustments in which FIG. 3a shows an adjustment with one orifice or hole exposed and the remaining holes or orifices sealed off or not exposed; in which FIG. 3b shows an adjustment with two orifices or holes exposed and the remaining holes or orifices sealed off or not exposed; in which FIG. 3c shows an adjustment with three orifices or holes exposed and the remaining holes or orifices sealed off or not exposed; in which FIG. 3d shows an adjustment with four orifices or holes exposed and the remaining hole or orifice sealed off or not exposed; and in which FIG. 3e shows an adjustment with five orifices or holes exposed and no holes or orifices sealed off or not exposed. The gas receiving part 12f is disclosed herein, by way of example, as having five (5) holes or orifices; however, the scope of the present invention is intended to include embodiments having more or less than five (5) holes or orifices, including 2, 3 or 4 holes or orifices, as well as 6, 7, 8, etc. holes or orifices.

As shown in FIG. 1, the gas adjustment member 14 may be configured with the gas inlet 14a; and the mixing and metering member 12 may include the fluid inlet 12a, the mixing chamber $12b$ and the metering orifice member $12c$. As best shown in FIG. 2, the metering orifice member $12c$ may include:

a first portion $12c_1$ formed with the first set of orifices $12d$ configured to allow the fluid to pass from the fluid inlet $12a$ to the mixing chamber $12b$, as shown in FIG. 1; and a second portion $12c_2$ configured so as to form an enclosed space or cavity therein generally indicated as $12c_3$, configured with the second set of orifices $12e$ to allow the gas to pass from the gas inlet $14ab$ into the enclosed space or cavity $12c_3$, as shown in FIG. 1, and also configured with the third set of orifices, including the multiple inlet holes $12g_1$ and/or the two diametrically opposed inlet holes $12g_2$ (see FIG. 4), to allow the gas to pass from the enclosed space or cavity $12c_3$ to the mixing chamber $12b$.

In FIG. 1, the O-ring $14b$ may be configured to engage the gas receiving part $12f$, so that any of the second set of orifices $12e$ on one side of the O-ring $14b$ are in communication with the gas inlet $14a$ so the gas can pass through, and so that any other of the second set of orifices $12e$ on the other side of the O-ring $14b$ are not in communication with the gas inlet so the gas cannot pass through, consistent with that shown in FIGS. $3a$ through $3e$.

The gas adjustment member 14 may be configured with an internal circumferential groove $14c$ and the O-ring $14b$ may be arranged therein, as shown.

The second portion $12c_2$ (FIG. 2) of the metering orifice member $12c$ may include a check valve arrangement or combination $12l$, $12m$ configured to seal one part of the enclosed space or cavity $12c_3$ of the second portion $12c_2$ having the second set of orifices $12e$ from another part $12c_4$ of the enclosed space or cavity of the second portion $12c_2$ having the third set of orifices $12d$.

The check valve arrangement or combination may include the ball $12l$ and the spring $12m$ arranged therein, as shown in FIGS. 1, 2, $3a$ to $3e$, and 4.

The check valve arrangement or combination $12l$, $12m$ may be configured to allow the amount of gas to pass from said another part $12c_4$ (FIG. 2) of the enclosed space or cavity $12c_3$ through the third set of orifices $12d$ to the mixing chamber $12b$ and to prevent the fluid from passing from the mixing chamber $12b$ into said another part $12c_4$ of enclosed space or cavity $12c_3$ of the second portion $12c_2$ having the second set of orifices $12e$, based at least partly the pressure of the gas in the enclosed space or cavity $12c_3$ and the pressure of the fluid/gas mixture in the mixing chamber $12b$.

The pressure of the gas in the enclosed space or cavity $12c_3$ may be based at least partly on the number of the second set of orifices $12e$ that the gas can pass through.

Figure 4:
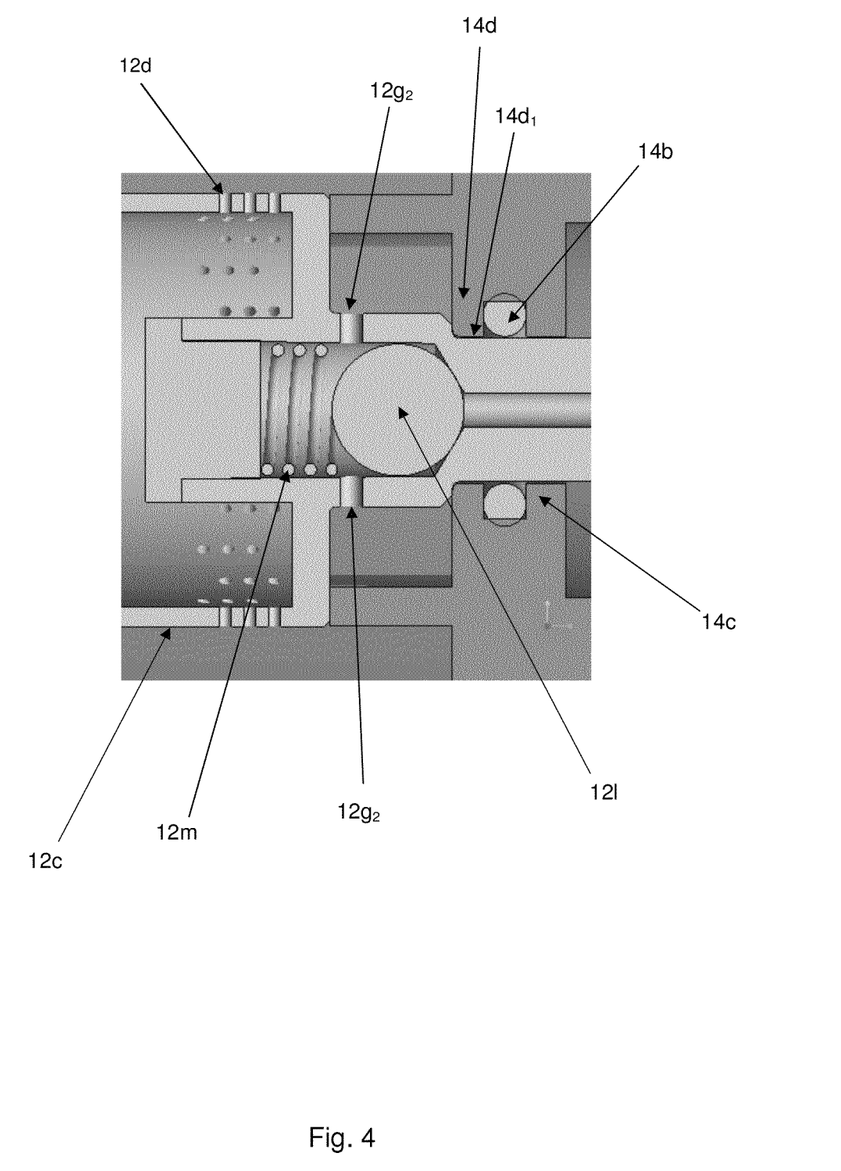
FIG. 4 is a cutaway view of a mixing orifice member, similar to and consistent with that shown in FIG. 2, rotated 90° so as to show diametrically opposed holes for providing gas to the mixing chamber, according to some embodiments of the present invention.

The gas adjustment member 14 may include an end portion $14d$ having an opening $14d'$ formed therein configured and dimensioned to receive the gas receiving part $12f$, as shown and indicated with lead lines and reference numerals in FIG. 4.

Figure 5:
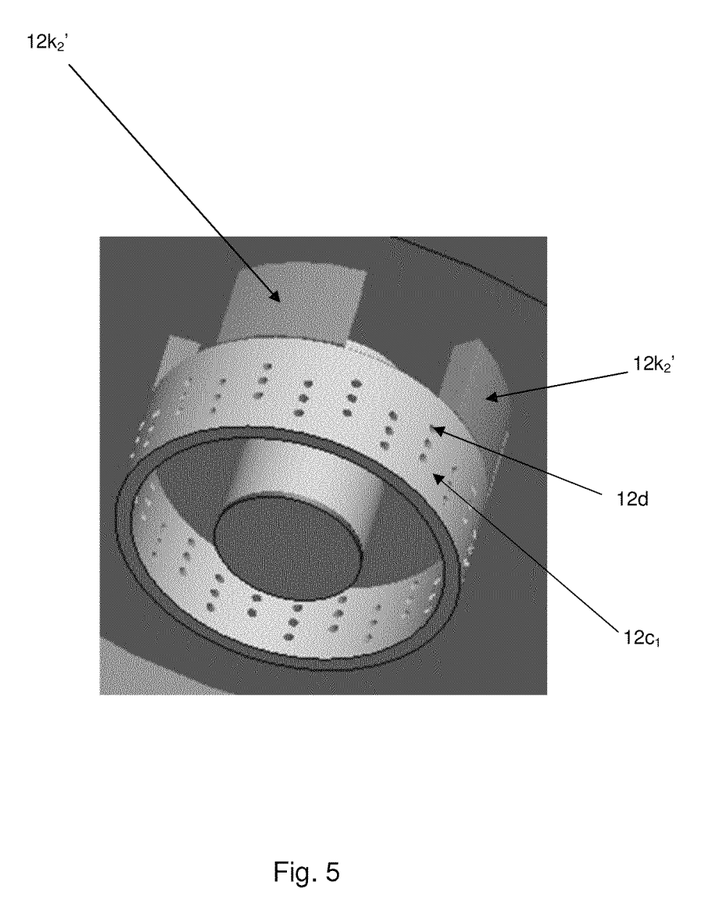
FIG. 5 is a perspective view of part of a mixing orifice member, similar to and consistent with that shown in FIGS. 2 and 4, according to some embodiments of the present invention.

In FIG. 2, the first portion $12c_1$ of the metering orifice member $12c$ may include or be shaped as a cylindrical portion $12c_5$ having a cylindrical wall $12c_5'$, and the first set of orifices $12d$ may be configured or formed as an encircling arrangement of a multiplicity of orifices arranged circumferentially around the cylindrical wall $12c_5'$, as best shown in FIG. 5. The cylindrical portion $12c_5$ may include a longitudinal axis generally indicated as L and the first set of orifices $12d$ may be configured or formed as a plurality of encircling arrangements $12d_1$, $12d_2$, $12d_3$, $12d_4$, each encircling arrangement having a respective multiplicity of orifices $12d$ arranged circumferentially around the cylindrical wall $12c_5'$. In FIGS. 1, 2, $3a$ to $3e$, 4 and 5, the plurality of encircling arrangements $12d_1$, $12d_2$, $12d_3$, $12d_4$ includes four (4) arrangements, including two outer arrangements $12d_1$, $12d_4$ having half as many holes or orifices $12d$ as the two inner arrangements $12d_2$, $12d_3$, as best shown in FIG. 5. The multiplicity of orifices $12d$, as well as the encircling arrangements $12d_1$, $12d_2$, $12d_3$, $12d_4$, arranged circumferentially around the cylindrical wall $12c_5'$, including being arranged or spaced equi-distantly around the cylindrical wall $12c_5'$.

The second set of orifices $12e$ may be configured or formed as an arrangement of holes or orifices arranged axially along the cylindrical wall of the gas receiving part $12f$, as best shown on FIG. 2. The second set of orifices $12e$ may be configured or formed along or in parallel with the longitudinal axis L. The second set of orifices $12e$ may be arranged or spaced equi-distantly along the cylindrical wall, although embodiments are envisioned in which the second set of orifices $12e$ are arranged or spaced in a non-equi-distant arrangement.

The first set of orifices $12d$, the second set of orifices $12e$, the third set of orifices $12g_1$ and/or $12g_2$, or some combination thereof, may be configured or formed as circular orifices. Alternatively, first set of orifices $12d$, the second set of orifices $12e$, the third set of orifices $12g_1$ and/or $12g_2$, or some combination thereof, may be configured or formed as non-circular orifices, including being shaped as a triangle, a square, a pentagon, a hexagon, a heptagon or an octagon. The scope of the invention is not intended to be limited to the type or kind of geometric configuration of the holes or orifices. The scope of the invention is not intended to be limited to the size or dimension of the holes or orifices. For example, embodiments are envisioned having holes or orifices having one size or dimension for one type of application, and embodiments are envisioned having holes or orifices having another size or dimension for another type of application.

The gas adjustment member 14 may be configured to be rotationally adjustable in relation to the gas receiving part $12f$ of the second portion $12c_2$, so as to be screwed or rotated towards or away from the metering orifice member $12c$, consistent with that shown in the embodiment shown in FIGS. $3a$ through $3e$. For example, the gas adjustment member 14 may include threads $14e$, the gas housing $12k$ of the mixing and metering member 1 may include corresponding threads $12n$, and the threads $14e$ of the gas adjustment member 14 may be configured to rotationally coupling to the corresponding threads $12n$ of the gas housing $12k$ of the mixing and metering member 12. The apparatus 10 may also be configured with a locking nut 20 for locking the mixing and metering member 12 and gas adjustment member 14 together.

The mixing and metering member 12 may include a fluid housing $12j$ configured with a fluid housing wall $12j_1$ having the fluid inlet $12a$ formed therein.

The mixing and metering member 12 may also include a gas housing $12k$ configured with a first gas housing wall $12k_1$ to couple to the fluid housing wall $12j_1$ of the fluid housing $12j$ and also to form the mixing chamber $12b$ therein.

The gas housing $12k$ may include a second gas housing wall $12k_2$, and the metering orifice member $12c$ may be configured between the fluid housing wall $12j_1$ of the fluid housing $12j$ and the second gas housing wall $12k_2$ of the gas housing $12k$ so that the first portion $12c_1$ of the metering orifice member $12c$ is arranged between the fluid inlet $12a$ and the mixing chamber $12b$.

The second gas housing wall $12k_2$ may be configured or formed with a central opening $12k_3$ to receive the gas receiving part $12f$ of the second portion $12c_2$ and also to allow the gas receiving part $12f$ to extend outwardly beyond the central opening $12k_3$, so as to allow the gas to pass directly from the metering orifice member $12c$ to the mixing chamber $12b$.

The central opening $12k_3$ has a central opening wall that may be configured or formed with the internal groove $12k_4$ and an O-ring $12k_5$ arranged therein to engage the gas receiving part $12f$ in a sealing manner or way.

The second gas housing wall $12k_2$ may include extending members or support $12k_2$, configured to seat a back wall of the first portion $12c_1$ of the metering orifice member $12c$ when the fluid housing $12j$ and gas housing $12k$ are coupled together.

The fluid housing wall $12j_1$ may include a circumferential groove or channel $12j_2$ configured to receive a rim portion of the first portion $12c_1$ of the metering orifice member $12c$ when the fluid housing $12j$ and gas housing $12k$ are coupled together.

The fluid housing wall $12j_1$ may also include a circumferential flange $12j_3$ configured to receive the first gas housing wall $12k_1$ when the fluid housing $12j$ and gas housing $12k$ are coupled together.

In FIGS. 3a to 3e, inner and outer O-rings $14b'$ and $14b''$ are configured in relation to the gas housing $12k$ of the mixing and metering 12 and the gas adjustment member 14, and the gas receiving member $12f$ of the mixing and metering 12 and the gas adjustment member 14, both for the purposes of providing sealing.

In FIGS. 3a to 3e, inner and outer O-rings $14b'''$ and $14b''''$ are configured in relation to one part of the water housing $12j$ of the mixing and metering 12 and the gas housing $12k$, and another part of the water housing $12j$ and the first portion $12c_1$ of the metering orifice member $12c$, both for the purposes of providing sealing.

List Possible Applications

By way of example, possible applications of some embodiments of the present invention include beverage dispensing applications.

The Scope of the Invention

Further still, the embodiments shown and described in detail herein are provided by way of example only; and the scope of the invention is not intended to be limited to the particular configurations, dimensionalities, and/or design details of these parts or elements included herein. In other words, a person skilled in the art would appreciate that design changes to these embodiments may be made and such that the resulting embodiments would be different than the embodiments disclosed herein, but would still be within the overall spirit of the present invention.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What we claim is:

1. Apparatus, including a carbonation chamber, comprising:
    a mixing and metering member comprising a gas receiving part, the mixing and metering member being configured to respond to a fluid containing water, and an adjustable amount of gas, and configured to provide a mixture of the fluid and the gas; and
    a gas adjustment member comprising a sealing member, the gas adjustment member being configured to receive the gas, including from a gas inlet, and to provide the adjustable amount of gas to the mixing and metering member, based at least partly on an adjustable axial relationship between the gas receiving part of the mixing and metering member and the sealing member of the gas adjustment member in order to control a desired carbonation level of the mixture.

2. Apparatus according to claim 1, wherein
    the gas receiving part comprises axially arranged gas receiving orifices;
    the sealing member comprises an O-ring; and
    the adjustable amount of gas provided from the gas adjustment member to the mixing and metering member is based at least partly of the adjustable axial relationship between the axially arranged gas receiving orifices of the gas receiving part and the O-ring of the sealing member.

3. Apparatus according to claim 2, wherein the adjustable amount of gas provided from the gas adjustment member to the mixing and metering member is based at least partly on the number of the axially arranged gas receiving orifices being sealing off or exposed by the O-rings.

4. Apparatus according to claim 1, wherein the gas is $CO_2$.

5. Apparatus, including a carbonation chamber, comprising:
    a mixing and metering member comprising a metering orifice member, a fluid inlet and a mixing chamber, the mixing and metering member being configured to respond to a fluid containing water, and an adjustable amount of gas, and configured to provide a mixture of the fluid and the gas, the metering orifice member comprising:
        a first portion formed with a first set of orifices configured to allow the fluid to pass from the fluid inlet to the mixing chamber, and
        a second portion configured so as to form an enclosed space or cavity therein, configured with a second set of orifices to allow the gas to pass from the gas inlet into the enclosed space or cavity, and configured with a third set of orifices to allow the gas to pass from the enclosed space or cavity to the mixing chamber, including directly into the mixing chamber or via the first set of orifices into the mixing chamber; and
    a gas adjustment member, configured to receive the gas, including from a gas inlet, and to provide the adjustable amount of gas to the mixing and metering member, based at least partly on an adjustable axial relationship between the mixing and metering member and the gas adjustment member in order to control a desired carbonation level of the mixture.

6. Apparatus according to claim 5, wherein the gas is $CO_2$.

7. Apparatus, including a carbonation chamber, comprising:
    a mixing and metering member, configured to respond to a fluid containing water, and an adjustable amount of gas, and configured to provide a mixture of the fluid and the gas; and
    a gas adjustment member, configured to receive the gas, and to provide the adjustable amount of gas to the mixing and metering member, based at least partly on an adjustable axial relationship between the mixing and metering member and the gas adjustment member in order to control a desired carbonation level of the mixture, wherein the mixing and metering member comprises a metering orifice member having a first portion formed with a first set of orifices configured to allow the fluid to pass from a fluid inlet to a mixing chamber, and having a second portion configured so as to form an enclosed space or cavity therein, configured with a gas receiving part having a second set of orifices formed therein to allow the gas, to pass from a gas inlet into the enclosed space or cavity, and configured with a third set of orifices to allow the gas to pass from the enclosed space or cavity to the mixing chamber, including directly into the mixing chamber or via the first set of orifices into the mixing chamber; and the gas adjustment member is configured to receive the gas receiving part of the second portion, and also configured to be adjusted up or down the gas receiving part to control the amount of gas that passes to the mixing chamber and the carbonation level of the fluid.

8. Apparatus according to claim 7, wherein the gas adjustment member comprises a sealing portion or member configured to be adjusted up or down the gas receiving part so to allow the gas to pass from the gas inlet through one or more of the second set of orifices into the enclosed space or cavity.

9. Apparatus according to claim 8, wherein the sealing portion or member comprises an O-ring configured to engage the gas receiving part, so that any of the second set of orifices on one side of the O-ring in communication with the gas inlet can pass gas through, and so that any other of the second set of orifices on the other side of the O-ring not in communication with the gas inlet cannot pass gas through.

10. Apparatus according to claim 9, wherein the gas adjustment member is configured with an internal circumferential groove and the O-ring is arranged therein.

11. Apparatus according to claim 7, wherein the second portion of the metering orifice member comprises a check valve configured to seal one part of the enclosed space or cavity of the second portion having the second set of orifices from another part of the enclosed space or cavity of the second portion having the third set of orifices.

12. Apparatus according to claim 11, wherein the check valve comprises an arrangement or combination of a ball and spring arranged therein.

13. Apparatus according to claim 11, wherein the check valve is configured to allow the amount of gas to pass from the enclosed space or cavity through the third set of orifices to the mixing chamber and to prevent the fluid from passing from the mixing chamber into said another part of enclosed space or cavity of the second portion having the second set of orifices, based at least partly on the pressure of the gas in the enclosed space or cavity and the pressure of a fluid/gas mixture in the mixing chamber.

14. Apparatus according to claim 13, wherein the pressure of the gas in the enclosed space or cavity is based at least partly on the number of the second set of orifices that the gas can pass through.

15. Apparatus according to claim 7, wherein the gas adjustment member comprises an end portion having an opening formed therein configured to receive the gas receiving part and to allow the amount of gas to pass from the gas inlet through one or more of the second set of orifices to the enclosed space or cavity of the second portion of the metering orifice member.

16. Apparatus according to claim 7, wherein the first portion comprises a cylindrical portion having a cylindrical wall, and the first set of orifices is configured or formed as an encircling arrangement of a multiplicity of orifices arranged circumferentially around the cylindrical wall.

17. Apparatus according to claim 16, wherein the cylindrical portion has a longitudinal axis and the first set of orifices is configured or formed as a plurality of encircling arrangements, each having a respective multiplicity of orifices arranged circumferentially around the cylindrical wall.

18. Apparatus according to claim 16, wherein the multiplicity of orifices arranged circumferentially around the cylindrical wall are arranged or spaced equi-distantly around the cylindrical wall.

19. Apparatus according to claim 7, wherein the second portion comprises a second cylindrical portion having a cylindrical wall, and the second set of orifices is configured or formed as an arrangement of orifices arranged axially along the cylindrical wall.

20. Apparatus according to claim 19, wherein the cylindrical portion has a longitudinal axis and the second set of orifices is configured or formed along or in parallel with the longitudinal axis.

21. Apparatus according to claim 19, wherein the second set of orifices are arranged or spaced equi-distantly along the cylindrical wall.

22. Apparatus according to claim 7, wherein the second portion comprises a third cylindrical portion having a cylindrical wall, and the third set of orifices is configured or formed as an axial arrangement of a multiplicity of orifices formed in the cylindrical wall.

23. Apparatus according to claim 22, wherein the multiplicity of orifices are formed as a pair of orifices diametrically opposed from one another.

24. Apparatus according to claim 7, wherein the apparatus comprises the mixing chamber configured to mix the fluid passing through the first set of orifices and the gas passing through the third set of orifices.

25. Apparatus according to claim 24, wherein the mixing chamber is configured or formed with an aeration port having a multiplicity of orifices to maintain a back pressure in the mixing chamber so as to provide a dwell time to allow the fluid and gas to mix.

26. Apparatus according to claim 25, wherein the aeration port is configured to provide turbulence so as to provide increased fluidic surface area for the fluid and gas to mix.

27. Apparatus according to claim 7, wherein the fluid in the fluid inlet is under pressure sufficiently high enough to force the fluid through the first set of orifices so as to create and expose increased fluidic surface area for the fluid and gas to mix.

28. Apparatus according to claim 7, wherein the first set of orifices, the second set of orifices, the third set of orifices, or some combination thereof, is configured or formed as circular orifices.

29. Apparatus according to claim 7, wherein the first set of orifices, the second set of orifices, the third set of orifices, or some combination thereof, is configured or formed as non-circular orifices, including being shaped as a triangle, a square, a pentagon, a hexagon, a heptagon or an octagon.

30. Apparatus according to claim 7, wherein the gas adjustment member is configured to be slidably adjustable in relation to the gas receiving part of the second portion, so as to move smoothly along the surface of the gas receiving part.

31. Apparatus according to claim 7, wherein the gas adjustment member is configured to be rotationally adjustable in relation to the gas receiving part of the second portion, so as to screw towards or away from the metering orifice member.

32. Apparatus according to claim 31, wherein the gas adjustment member comprises threads, the metering orifice member comprises corresponding threads, and the threads of the gas adjustment member are configured to rotationally coupling to the corresponding threads of the metering orifice member.

33. Apparatus according to claim 7, wherein the apparatus comprises a fluid housing configured with a fluid housing wall having the fluid inlet formed therein.

34. Apparatus according to claim 33, wherein the apparatus comprises a gas housing configured with a first gas housing wall to couple to the fluid housing wall of the fluid housing and also to form the mixing chamber therein.

35. Apparatus according to claim 34, wherein the gas housing comprises a second gas housing wall, and the metering orifice member is configured between the fluid housing wall of the fluid housing and the second gas housing wall of the gas housing so that the first portion of the metering orifice member is arranged between the fluid inlet and the mixing chamber.

36. Apparatus according to claim 35, wherein the second gas housing wall is configured or formed with a central opening to receive the gas receiving part of the second portion and also to allow the gas receiving part to extend outwardly beyond the central opening.

37. Apparatus according to claim 35, wherein the central opening is configured or formed by a central opening wall that includes an internal groove and an O-ring arranged therein to engage the gas receiving part in a sealing manner or way.

38. Apparatus according to claim 35, wherein the second gas housing wall comprises two or more extending members or supports configured to seat a back wall of the first portion of the metering orifice member when the fluid housing and gas housing are coupled together, so as to allow the gas to pass directly from the metering orifice member to the mixing chamber.

39. Apparatus according to claim 35, wherein the fluid housing wall comprises a circumferential groove or channel configured to receive the first portion of the metering orifice member when the fluid housing and gas housing are coupled together.

40. Apparatus according to claim 35, wherein the fluid housing wall comprises a circumferential flange configured to receive the first gas housing wall when the fluid housing and gas housing are coupled together.

41. Apparatus according to claim 7, wherein the gas is $CO_2$.

* * * * *